United States Patent
Da et al.

(10) Patent No.: US 9,667,625 B2
(45) Date of Patent: May 30, 2017

(54) ACCESS CONTROL METHOD, AUTHENTICATION METHOD, AND AUTHENTICATION DEVICE

(71) Applicants: Bin Da, Beijing (CN); Wei Wang, Beijing (CN); Linju Yang, Beijing (CN); Ke Liao, Beijing (CN); Yan Sun, Beijing (CN)

(72) Inventors: Bin Da, Beijing (CN); Wei Wang, Beijing (CN); Linju Yang, Beijing (CN); Ke Liao, Beijing (CN); Yan Sun, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/790,269

(22) Filed: Jul. 2, 2015

(65) Prior Publication Data

US 2016/0014118 A1 Jan. 14, 2016

(30) Foreign Application Priority Data

Jul. 10, 2014 (CN) .......................... 2014 1 0327928

(51) Int. Cl.
*H04L 29/06* (2006.01)
(52) U.S. Cl.
CPC .......... *H04L 63/0853* (2013.01); *H04L 63/10* (2013.01); *H04L 63/107* (2013.01); *H04L 63/123* (2013.01)
(58) Field of Classification Search
CPC ... H04L 63/0853; H04L 63/10; H04L 63/107; H04L 63/123
See application file for complete search history.

(56) References Cited

U.S. PATENT DOCUMENTS

| 6,842,460 | B1 * | 1/2005 | Olkkonen | .............. | H04W 48/16 370/328 |
| 9,055,436 | B2 | 6/2015 | Sun et al. | | |
| 2002/0144144 | A1 * | 10/2002 | Weiss | ...................... | H04L 9/321 726/15 |
| 2005/0120246 | A1 * | 6/2005 | Jang | .................... | H04L 12/2807 726/4 |

(Continued)

FOREIGN PATENT DOCUMENTS

CN 103813325 A 5/2014

*Primary Examiner* — Michael Pyzocha
(74) *Attorney, Agent, or Firm* — Cooper & Dunham LLP

(57) ABSTRACT

Disclosed is an access control method of an area restricted network system including a central control device and at least one area restricted network. Each area restricted network includes at least a master node. The method comprises a detection step of detecting that an access device has entered into an area restricted network in the area restricted network system; a receipt step of receiving, by a master node in the area restricted network, an authentication information request sent by the access device; a sending step of, in response to the authentication information request, generating and sending the authentication information for the access device by the master node in the area restricted network; and a request step of, by the access device, receiving the authentication information, and then utilizing the authentication information so as to send an authentication request to the central control device.

10 Claims, 10 Drawing Sheets

(56) References Cited

U.S. PATENT DOCUMENTS

| | | | |
|---|---|---|---|
| 2005/0179519 A1* | 8/2005 | Kawamura | B60R 25/24 340/5.23 |
| 2005/0201393 A1* | 9/2005 | Hatayama | H04L 12/2807 370/401 |
| 2006/0251256 A1* | 11/2006 | Asokan | H04L 63/065 380/270 |
| 2007/0015463 A1* | 1/2007 | Abel | H04B 5/0031 455/41.1 |
| 2008/0083022 A1* | 4/2008 | Lee | H04L 63/08 726/5 |
| 2008/0267407 A1* | 10/2008 | Vanderveen | H04L 9/083 380/277 |
| 2010/0238798 A1* | 9/2010 | Ahuja | H04L 41/0681 370/225 |
| 2010/0263022 A1* | 10/2010 | Wynn | H04W 12/06 726/3 |
| 2011/0162048 A1* | 6/2011 | Bilbrey | H04W 8/005 726/4 |
| 2012/0017088 A1* | 1/2012 | Liu | H04L 9/321 713/171 |
| 2013/0103833 A1* | 4/2013 | Ringland | H04L 63/0823 709/224 |
| 2013/0178163 A1* | 7/2013 | Wang | H04W 4/008 455/41.2 |
| 2013/0336240 A1* | 12/2013 | Cherian | H04W 76/025 370/329 |
| 2013/0336485 A1 | 12/2013 | Da et al. | |
| 2014/0126416 A1* | 5/2014 | Yu | H04W 84/20 370/254 |
| 2014/0188985 A1* | 7/2014 | Park | H04L 67/10 709/203 |
| 2014/0219262 A1 | 8/2014 | Sun et al. | |
| 2014/0241207 A1 | 8/2014 | Zhang et al. | |
| 2014/0342667 A1* | 11/2014 | Aarnio | H04W 4/008 455/41.2 |
| 2014/0378057 A1* | 12/2014 | Ramon | H04L 9/32 455/41.2 |
| 2015/0029959 A1 | 1/2015 | Da et al. | |
| 2015/0089606 A1 | 3/2015 | Wang et al. | |
| 2015/0223068 A1* | 8/2015 | Thelen | H04L 63/083 726/7 |
| 2015/0248702 A1* | 9/2015 | Chatterton | G06Q 30/0261 705/14.58 |
| 2015/0289295 A1* | 10/2015 | Granbery | H04W 76/023 370/230 |
| 2015/0348146 A1* | 12/2015 | Shanmugam | G06Q 30/0603 705/71 |
| 2016/0112409 A1* | 4/2016 | Le | H04L 63/0823 713/156 |
| 2016/0302060 A1* | 10/2016 | Agardh | H04L 67/16 |

* cited by examiner

ACCESS CONTROL METHOD, AUTHENTICATION METHOD, AND AUTHENTICATION DEVICE

BACKGROUND OF THE INVENTION

1. Field of the Invention

The present invention relates to an area restricted network, and particularly relates to an access control method of an area restricted network system as well as an authentication method and an authentication device for carrying out authentication with respect to an access device in the area restricted network system.

2. Description of the Related Art

An ad hoc network is a kind of self-organized wireless network. Compared to a conventional wireless network, the ad hoc network does not rely on any fixed infrastructure or administration center, and is temporarily established by a group of independent mobile nodes (devices). On the basis of the cooperation and self-organization between the mobile nodes, it is possible to keep the network connection and to achieve the data transmission. In a conventional ad hoc network, there isn't a predetermined boundary (e.g., an artificially defined boundary) for restricting an area; in general, the maximum transmission distance of a mobile node (e.g. a master) is used to restrict the area.

At present, there are some techniques for restricting the areas of ad hoc networks. Regarding these kinds of ad hoc networks which may form an area restricted network system, each ad hoc network (also called an "area restricted ad hoc (ARA) network" or "area restricted network") is independent. Before an access device in each ARA network accesses the resource in the corresponding ARA network, it needs to be authenticated by the so-called "master node" in the corresponding ARA network. And after the access device is authenticated, it cannot access the Internet.

SUMMARY OF THE INVENTION

In light of the above, an access control method of an area restricted network system as well as an authentication method and an authentication device for carrying out authentication with respect to an access device in an area restricted network system are provided in the present invention.

According to a first aspect of the present invention, an access control method of an area restricted network system is provided. The area restricted network system includes a central control device and at least one area restricted network. Each area restricted network includes at least a master node. The access control method includes:

a detection step of detecting that an access device has entered into a first area restricted network in the area restricted network system;

a receipt step of, by a master node in the first area restricted network, receiving an authentication information request sent from the access device, wherein, the authentication information request is used to request authentication information for the access device from the master node;

a sending step of, in response to the received authentication information request, generating and sending the authentication information for the access device by the master node in the first area restricted network; and a request step of, by the access device, receiving the authentication information sent from the master node, and utilizing the authentication information so as to send an authentication request to the central control device.

According to a second aspect of the present invention, an authentication method is provided which is for carrying out authentication with respect to an access device, and is used in an area restricted network system. The area restricted network system includes at least one area restricted network, and each area restricted network includes at least a master node. The authentication method includes:

a receipt step of receiving an authentication request of an access device which has entered into a first area restricted network in the area restricted network system, wherein, the authentication request includes authentication information of the access device;

an acquisition step of acquiring, in response to the received authentication request, authentication information generated by a master node in the first area restricted network for the access device from the master node; and an authentication step of carrying out the authentication with respect to the access device based on the authentication information included in the authentication request received from the access device and the authentication information acquired from the master node.

According to a third aspect of the present invention, an authentication device is provided which is for carrying out authentication with respect to an access device, and is used in an area restricted network system. The area restricted network system includes at least one area restricted network, and each area restricted network includes at least a master node. The authentication device includes:

a receipt part configured to receive an authentication request of an access device which has entered into a first area restricted network in the area restricted network system, wherein, the authentication request includes authentication information of the access device;

an acquisition part configured to acquire, in response to the received authentication request, authentication information generated by a master node in the first area restricted network for the access device from the master node; and an authentication part configured to carry out the authentication with respect to the access device based on the authentication information included in the authentication request received from the access device and the authentication information acquired from the master node.

According to a fourth aspect of the present invention, a communications system is provided. The communications system includes:

at least one area restriction signal transmission device, each configured to broadcast an area restriction signal which is for restricting an area restricted network, and to detect that an access device has entered into the area restricted network restricted by the area restriction signal broadcasted by the corresponding area restriction signal transmission device;

at least one master device, each configured to be associated with an area restriction signal transmission device, and to receive an authentication information request sent from an access device detected by the area restriction signal transmission device associated with the corresponding master device, wherein, the authentication information request is used to request authentication information for the access device from the corresponding master device, and the corresponding master device generates and sends the authentication information for the access device in response to the authentication information request; and a central control device configured to receive an authentication request from the access device, and to carry out authentication with respect to the access device based on the authentication information of the access device.

As a result, in the communications system including the at least one area restricted network, it is possible to use the central control device thereof so as to be able to centrally control an access device to access the resource of any area restricted network in the communications system, and at the same time, the access device is also able to access the Internet.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
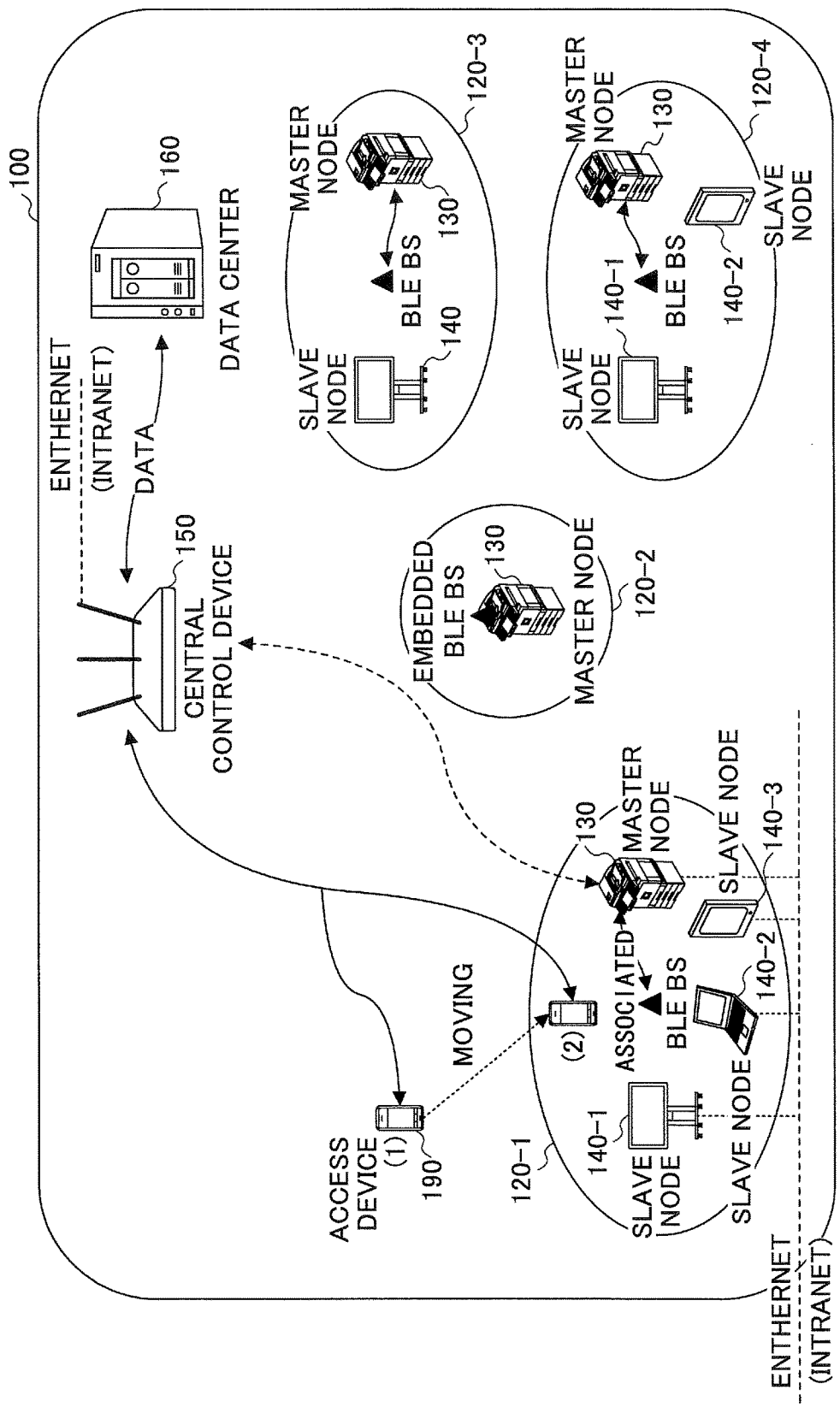
FIG. 1 illustrates an area restricted network system according to an embodiment of the present invention.

FIG. 1 illustrates an area restricted network system according to an embodiment of the present invention.

In a scenario such as an office, there may exist a few area restricted networks (i.e., ARA networks) in a network system area. For example, a mobile device such as a mobile phone, a tablet computer, or a notebook computer may need to frequently access different resources of different ARA networks and other data resources in the network system area.

For example, as shown in FIG. 1, a network system 100 includes plural area restricted networks 120-1, 120-2, 120-3, and 120-4 (hereinafter, in a case where it is not necessary to distinguish among the various area restricted networks, they may be called an "area restricted network 120"). A mobile device 190 intends to access a resource in the area restricted network (e.g., in FIG. 1, the area restricted network 120-1). For this purpose, the mobile device 190 needs to join the session in the area restricted network on the basis of a predetermined rule.

Each ARA network 120 includes one master node 130, and may not have any slave node or may have one or more slave nodes 140. For example, as shown in FIG. 1, the ARA network 120-1 has one master node 130 and plural slave nodes 140-1, 140-2, and 140-3; the ARA network 120-2 has only one master node 130, and does not have any slave nodes 140; the ARA network 120-3 has one master node 130 and one slave node 140; and so on. In each ARA network, one master node is associated with one area restriction signal transmission device. In other words, there is only one master node in each ARA network.

In the conventional techniques, a master node in each ARA network administers a session in the corresponding ARA network, and keeps its connection. That is to say, in an ARA network, both the connection of a slave node and an access to the slave node are controlled by a master node in the ARA network.

As shown in FIG. 1, the network system 100 further includes a central control device 150. As described above, in the conventional techniques, an access to a resource in each ARA network in controlled by a master node in the corresponding ARA network. However, in network system 100, an access to a resource in any ARA network is controlled by only the central control device 150. This will be concretely described below.

In an example, the central control device 150 may be a router. However, the present invention is not limited to this; that is to say, the central control device 150 may be any other proper device. The central control device 150 may be connected to each master node in a wireless or wired way. For example, in FIG. 1, they are connected by an intranet. The central control device 150 may also be connected to a data center 160 in a wireless or wired way, and the data center 160 is, for example, a local or remote data sever.

Regarding the establishment of an area restricted network system and the selection of master and slave nodes, it is also possible to see Chinese Patent Application Publication No. 103813325A whose entire contents are hereby incorporated by reference.

As described in the above reference, it is possible to adopt infrared rays (IRs), near field communications (NFC), ultrasonic waves, or microwaves to achieve the area restriction of an ARA network. In the embodiments of the present invention, a radio signal outside the Wi-Fi band is taken as an area restriction signal. In what follows, a Bluetooth low energy (BLE) signal is taken as an example for illustration. However, it should be noted that the present invention is not limited to this; in other words, it is also possible to adopt any other proper signal to serve as the area restriction signal.

As shown in FIG. 1, each base station (BS) sending the BLE signal (also called a "BLE BS") is associated with the master node 130. In an example, a BLE BS may be a BLE signal transmission device embedded in the corresponding master node 130; for example, the BLE signal transmission device in the area restricted network 120-2 is this kind of BLE BS. In another example, a BLE BS may be an independent device, and may communicate with the corresponding master node 130 by utilizing, for example, USB cable based direct connection, serial cable based direction connection, or Wi-Fi based direction connection; for example, the BLE signal transmission devices in the area restricted networks 120-1, 120-3, and 120-4 are these kinds of BLE BSs. As a result, in the coverage of the BLE BS associated with each master node 130, the corresponding area restricted network conforming to the ARA protocol is established, i.e., the area restricted networks 120-1, 120-2, 120-3, and 120-4.

In this way, it is possible to establish an area restricted network system. The area restricted network system includes a central control device and at least one area restricted network, and each area restricted network includes at least a master node.

Figure 2:
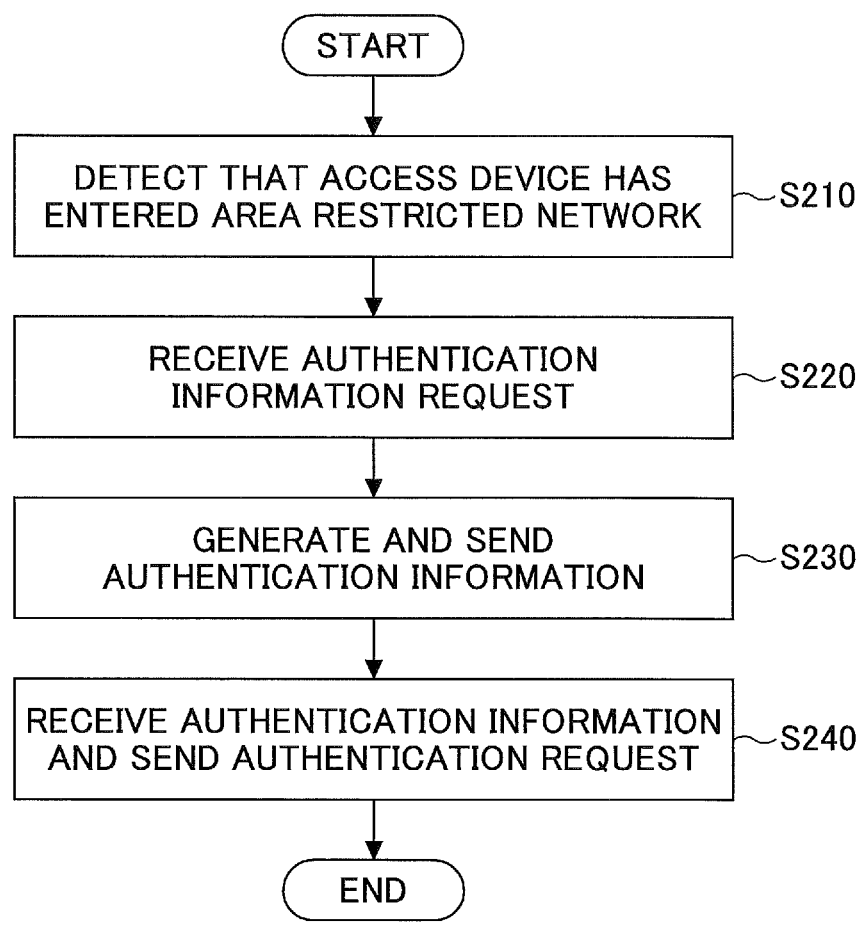
FIG. 2 is a flowchart of an access control method of an area restricted network system, according to an embodiment of the present invention.

FIG. 2 is a flowchart of an access control method of an area restricted network system, according to an embodiment of the present invention.

As shown in FIG. 2, the access control method includes STEPS S210 to S240. In STEP S210, it is detected that an access device (also called a "mobile device") has entered into a first area restricted network in the area restricted network system. In STEP S220, a master node in the first area restricted network receives an authentication information request sent by the access device. The authentication information request is used to request authentication information for the access device from the master node. In STEP S230, in response to the received authentication information request, the master node in the first area restricted network generates and sends the authentication information of the access device to the access device. In STEP 240, the access device receives the authentication information sent by the master node, and utilizes the received authentication information so as to send an authentication request to a central control device.

In what follows, the access control method shown in FIG. 2 will be concretely described by referring to FIGS. 3 to 6.

Figure 3:
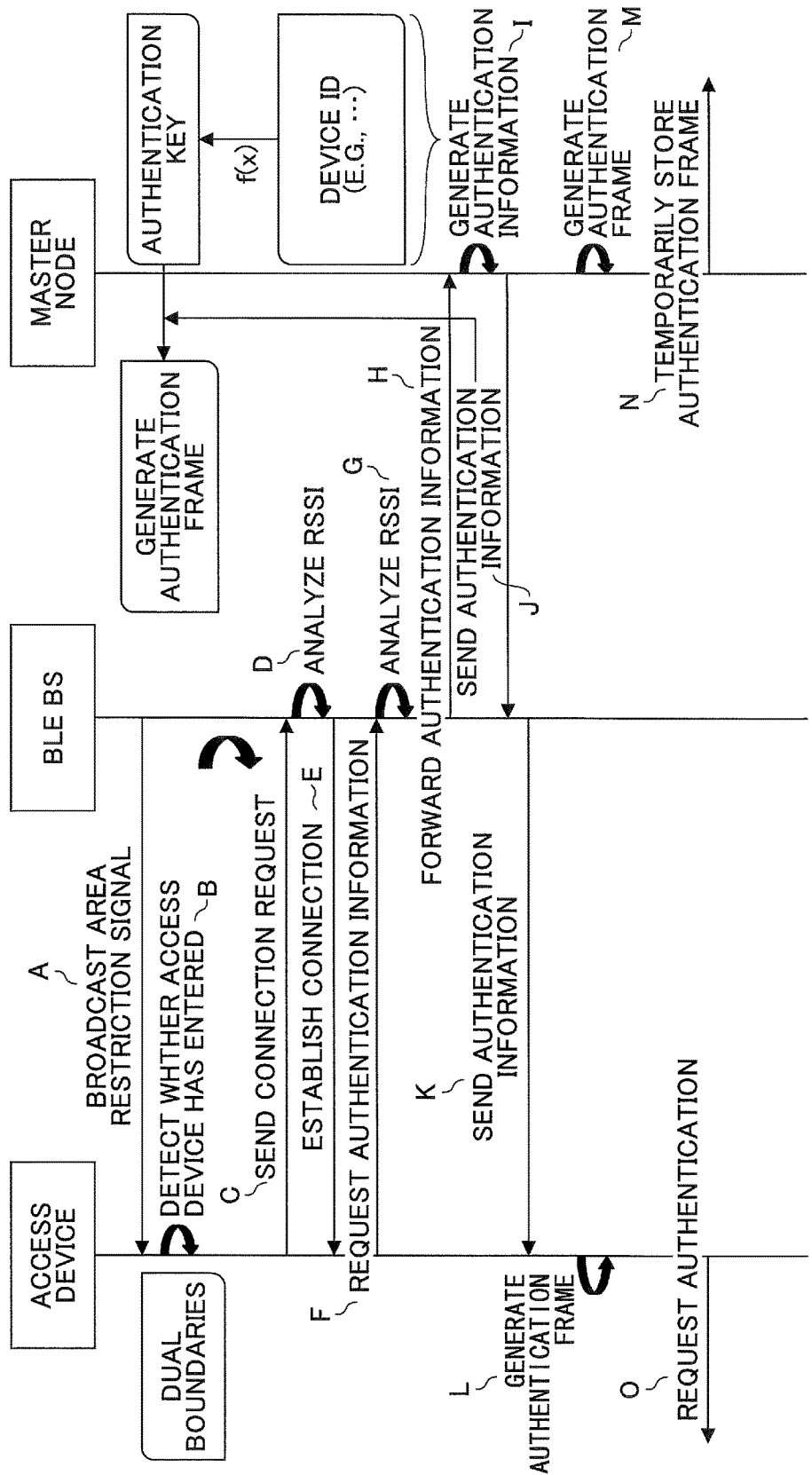
FIG. 3 illustrates a process sequence of the access control method shown in FIG. 2.

FIG. 3 illustrates a process sequence of the access control method shown in FIG. 2.

Figure 4:
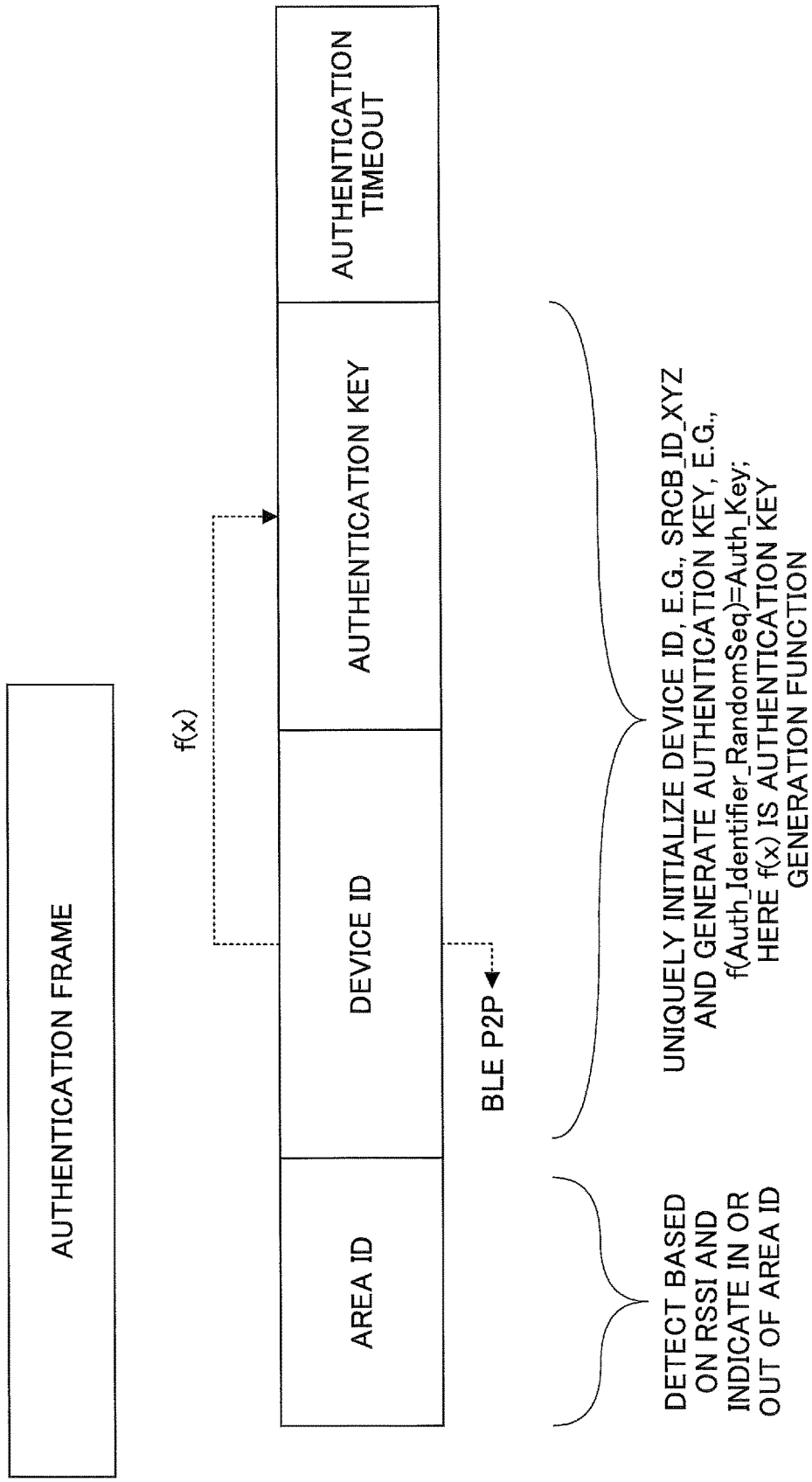
FIG. 4 illustrates an example of the structure of an authentication frame.

FIG. 4 illustrates an example of the structure of an authentication frame.

Figure 5:
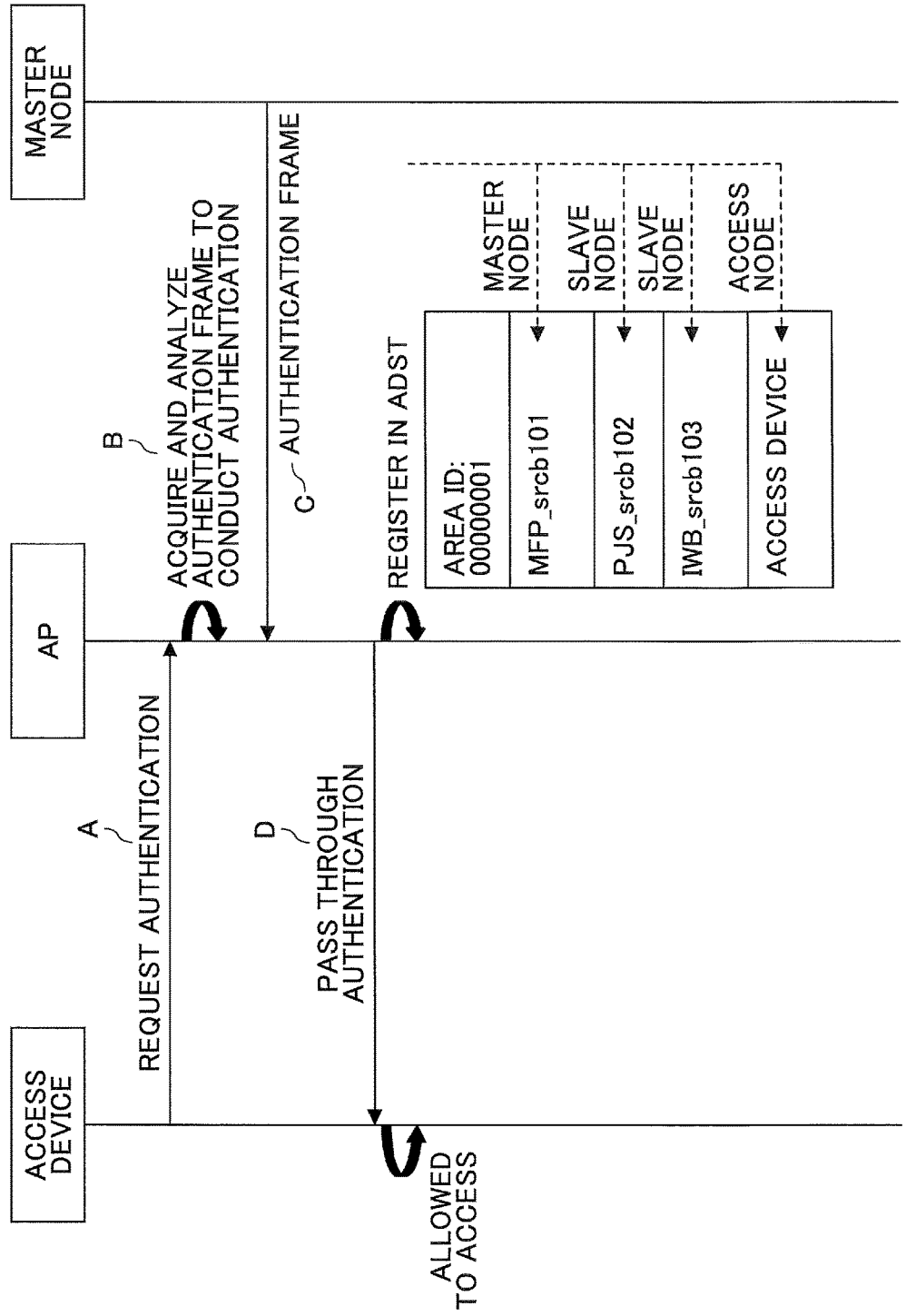
FIG. 5 illustrates another process sequence of the access control method shown in FIG. 2.

FIG. 5 illustrates another process sequence of the access control method shown in FIG. 2.

Figure 6:
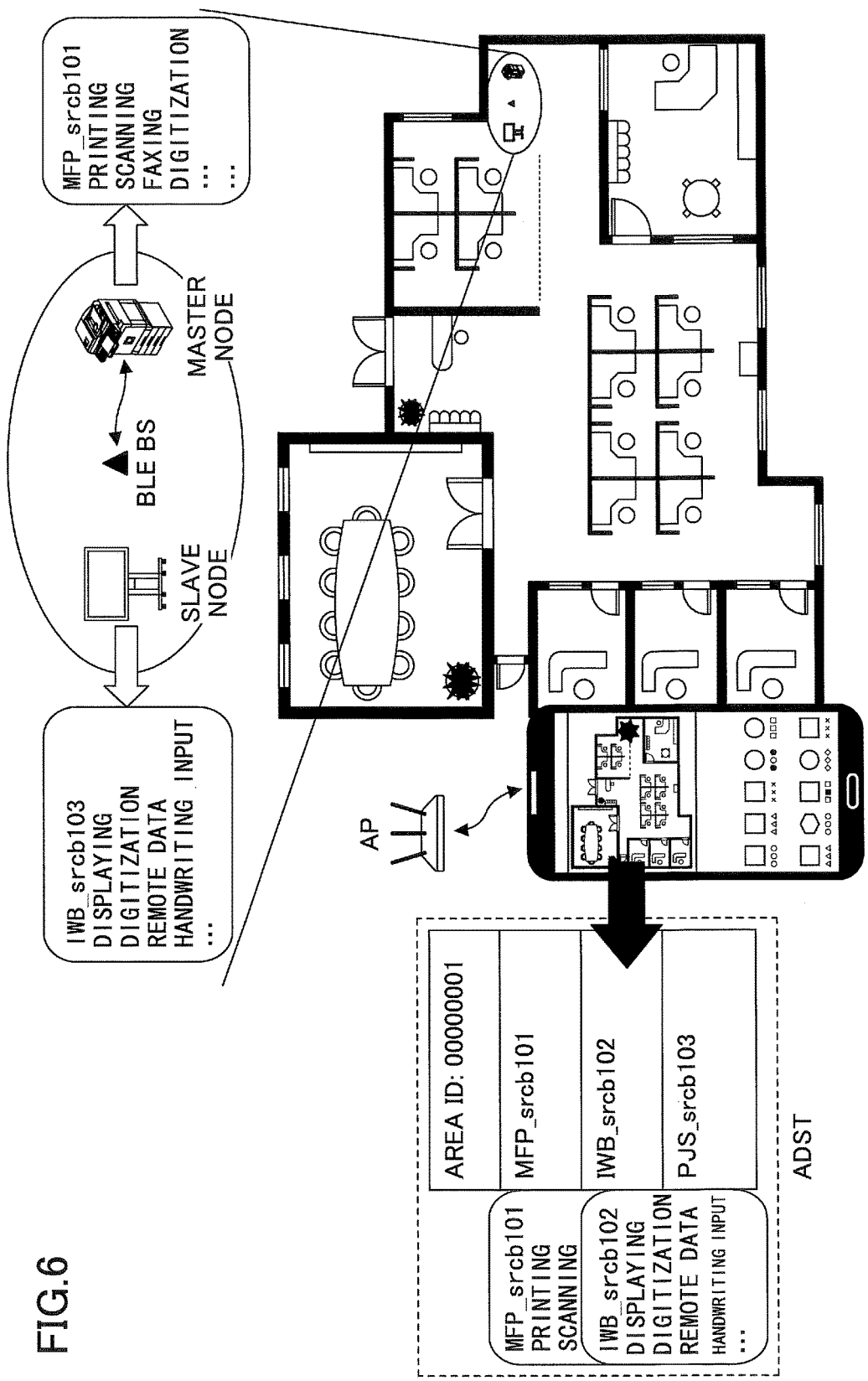
FIG. 6 illustrates an example of accessing a resource in an area restricted network by an access device.

FIG. 6 illustrates an example of accessing a resource in an area restricted network by an access device.

According to the access control method shown in FIG. 2, in STEP S210, it is determined whether there exists an access device which has entered into the first area restricted network in the area restricted network system. As shown by a process A in FIG. 3, in each area restricted network, an area restriction signal transmission device (e.g., a BLE BS) associated with a master node continuously broadcasts an area restriction signal (e.g., a BLE signal). The access device may include a proper signal receipt part for receiving an area restriction signal. When the access device approaches an area restriction signal transmission device, i.e., approaches the first area restricted network restricted by the corresponding area restriction signal transmission device, by detecting the signal strength of the area restriction signal received at the access device by using a detection part included in the access device, it is possible to determine whether the access device has entered into the first area restricted network.

In an example, it is possible to adopt the received signal strength indication (RSSI) value of the received area restriction signal to conduct the above determination, as shown by a process B in FIG. 3. In general, the RSSI value is calculated, and then, by comparing the calculated RSSI value and a predetermined threshold, it is possible conduct the above determination. However, in the embodiments of the present invention, a strip zone is adopted to conduct the above determination.

In particular, it is possible to predefine first and second thresholds Vth1 and Vth2 of the strip zone. In an example, the first threshold Vth1 may be preset to −45 dBM, and the second threshold Vth2 may be preset to −55 dBm. Of course, the present invention is not limited to this. Those people skilled in the art may preset any other proper values for the first and second thresholds according to an actual application environment.

For example, if the RSSI value of an area restriction signal received at an access device sent by a BLE BS is −40 dBm which is greater than the first threshold Vth1 (−45 dBm), then it is possible to determine that the access device has entered into the area restricted network restricted by the area restriction signal. And if the RSSI value is −60 dBm which is less than the second threshold Vth2 (−55 dBm), then it is possible to determined that the access device is outside the area restricted network.

Moreover, in a case where the RSSI value is greater than the second threshold Vth2 and less than the first threshold Vth1, the strip zone may be considered as a buffer zone. Regarding the access device whose related RSSI value is within the strip zone, it is possible to retain the determination result of the previous determination.

The reason is that a RSSI value may reflect the distance between an access device and a BLE BS, thereby being able to define, by first and second RSSI thresholds, a strip zone (e.g., from −55 dBm to −45 dBm). On the basis of this, only when the access device exceeds the strip zone boundary close to the BLE BS, it is possible to determine that the access device has entered into the area restricted network. And only when the access device departs from the strip zone boundary far from the BLE BS, it is possible to determine that the access device has exited from the area restricted network. As a result, it is possible to avoid the problem of inaccurate determination caused by the jitter of an area restriction signal in a single threshold based determination approach.

Of course, the above-proposed dual-threshold determination approach is not limited to conducting determination by using RSSI values. That is to say, it is also possible to apply any other proper values to the above-proposed dual-threshold determination approach.

After it is determined that the access device has entered into the first area restricted network, the establishment of secure communications connection between the access device and the BLE BS is triggered. For example, the communications connection may include, but not be limited to, P2P communications connection. In particular, the BLE signal broadcasted by the BLE BS may include the address of the BLE BS. After the access device receives the BLE signal, it may obtain the address of the BLE BS by conducting analysis. And then, the access device may send a connection request such as a P2P connect request to the address of the BLE BS, as shown by a process C in FIG. 3. In response to the connection request, the BLE BS may also carry out detection with respect to the access device. For example, by adopting the above-proposed dual-threshold determination approach, it is possible to determine whether the access device is located in the first area restricted network, as shown by a process D in FIG. 3. After the BLE BS determines that the access device has entered into the first area restricted network, it sends a response with respect to the connection request to the access device. As a result, for example, the P2P connection may be established between the access device and the BLE BS, as shown by a process E in FIG. 3.

Optionally, before the BLE BS sends the response, it may detect whether its own signal and the signal sent by the access device abide by a same standard. In the former case, the BLE BS sends the response, and in the latter case, it doesn't.

After it is determined that the access device has entered into the first area restricted network in STEP S210 shown in FIG. 2, in STEP S220, the access device requests authentication information.

Particularly, in an example, after the communications connection is established between the access device and the BLE BS as described above, the access device may send an authentication information request via the communications connection. The authentication information request is used to request the authentication information generated by the master node in the first area restricted network for the access device. The authentication information request may be received by the BLE BS (as shown by a process F in FIG. 3), and may be forwarded to the master node in a similar secure communications way (as shown by a process H in FIG. 3). Optionally, before the BLE BS conducts a further response or action in response to a request from the access device every time, it may send a signal to the access device (or request a signal from the access device) so as to determine, for example, by utilizing the above-proposed dual-threshold determination approach, whether the access device is still located in the first area restricted network. And only in the former case, the BLE BS may conduct the further response or action, as shown by a process G in FIG. 3.

After that, in STEP S230 shown in FIG. 2, in response to the received authentication information request, the master node generates the authentication information for the access device.

Particularly, in an example, the authentication information request may include an device ID of the access device. In response to the authentication information request of the access device forwarded from the BLE BS, the master node generates, on the basis of the device ID of the access device included in the authentication information request, an authentication key for the access device (as shown by a process I in FIG. 3), and sends a pair of the device ID and the authentication key so serve as the authentication information (as shown by a process J in FIG. 3).

The device ID is for uniquely identifying the access device in the all area restricted networks controlled by the central control device. In an example, the device ID may be expressed by a string, for example, ARID_XYZ in which ARID represents an ID of a restricted area where the access device is located, and XYZ represents an ID of the access device itself. In an example, the device ID may directly adopt the MAC address of the access device, for example, the last 16 digits of the MAC address. Of course, the present invention is not limited to this. That is to say, as long as it is possible to uniquely identify the access device, any other proper form may be adopted for making up the device ID.

Optionally, in an example, if the authentication information request of the access device does not include the device ID of the access device, then the device ID may be designated and sent to the access device by the master node.

After obtaining the device ID of the access device, the master node generates, on the basis of the device ID of the access device, the authentication key. For example, the master node may utilize a proper transformation function such as a hash function to conduct transformation with respect to the device ID so as to obtain the authentication key, namely, f(Device_ID)=Auth_Key. Here Device_ID refers to the device ID; Auth_Key refers to the authentication key; and f(x) refers to the authentication key generation function used by the master node.

Optionally, in order to improve the security, it is also possible to add additional information such as a random number or a time stamp into the authentication key.

In this way, the master node generates, on the basis of the device ID of the access device, the authentication information, and sends it as the response with respect to the authentication information request of the access device. For example, the authentication information sent by the master node may be received and forwarded to the access device by the BLE BS in a secure communications way, as shown by a process K in FIG. 3.

In STEP S240 shown in FIG. 2, the access device receives the authentication information, and utilizes the authentication information to send an authentication request to the central control device.

In particular, in an example, the access device generates, on the basis of the received authentication information, an authentication frame (AF), as shown by a process L in FIG. 3. In an example of the structure of the authentication frame shown in FIG. 4, the authentication frame includes a restricted area ID (ARID_In or ARID_Out); the device ID and authentication key included in the received authentication information; and an optional authentication timeout (Time_Out).

Here it should be noted that in order to indicate whether the access device is in the first area restricted network, and in order to support the central control device to simultaneously administer the at least one area restricted network so as to be able to determine in which area restricted network the access device is located, the authentication frame may include the restricted area ID ARID_In or ARID_Out, as shown in FIG. 4. Here ARID refers to the restricted area ID, and may be an eight-bit string which may support 255 (00000001 to 11111111) areas. Of course, the present invention is not limited to this. In addition, In or Out refers to entering into or departing from the area restricted network indicated by ARID, and may be expressed by one bit. For example, "0" refers to In, and "1" refers to Out; and vice versa.

As shown in FIG. 4, optionally, the authentication information may further include the authentication timeout (Time_Out) which is used to define a time interval from the time point when the access device sends the authentication request to the time point when the access device passes through the authentication, and may be 2 seconds, 5 seconds, etc. In a case of exceeding the time interval, the access device needs to resend an authentication request to the central control device.

Of course, the structure of the authentication frame shown in FIG. 4 is just an example. When generating the authentication frame, it is possible to put the respective fields shown in FIG. 4 into a standard frame structure prescribed in the conventional protocol. In addition, the structure of the authentication frame shown in FIG. 4 may further include other fields such as a header field and a tail check field.

On the other hand, the master node generating the authentication information for the access device also generates, in the same way, an authentication frame on the basis of the authentication information (as shown by a process M in FIG. 3), and temporarily stores the generated authentication frame in its buffer or storage so as to be able to be used by the central control device later (as shown by a process N in FIG. 3).

After generating the authentication frame on the basis of the received authentication information, the access device immediately sends the authentication request to the central control device (as shown by a process O in FIG. 3 and a process A in FIG. 5). In an example, the access device may, via a network such as a wired or wireless network or intranet, send the authentication request to the central control device. The authentication request includes the authentication frame generated by the access device.

After receiving the authentication frame generated by the access device, the central control device analyzes the authentication frame provided by the access device so as to obtain the authentication information of the access device, as shown by a process B in FIG. 5. And at the same time, the central control device asks the master node to send the authentication frame generated by the master node to itself, i.e., acquires the authentication frame from the master node, as shown by a process C in FIG. 5.

After acquiring the authentication frame from the master node, the central control device analyzes the authentication frame provided by the master node so as to obtain the authentication information generated by the master node for the access device. After that, the central control device conducts, on the basis of the authentication information sets respectively provided by the access device and the master node, an authentication process with respect to the access device. The authentication process may be a challenge-handshake authentication process or any other proper process such as a PTK or EAP based authentication process. In short, if the authentication information provided by the access device is the same as the authentication information provided by the master node, then the access device may pass through the authentication; otherwise, the access device may not.

Moreover, considering the data security, before the access device sends the authentication request to the central control device, and/or before the central control device acquires the authentication frame sent from the master node, it is also possible to conduct, on the basis of a protocol, encryption with respect to the contents to be sent. After receiving the encrypted contents, the central control device may conduct, on the basis of the protocol, decryption with respect to the encrypted contents. And then, the central control device conducts the follow-on authentication process.

In this way, the central control device may receive the authentication request from the access device, and at the same time, may acquire, from the master node in the first area restricted network, the authentication information generated by the master node for the access device. After that, the central control device may compare the authentication information acquired from the master node and the authentication information provided by the access device, so as to carry out authentication with respect to the access device, and then, may control, on the basis of the authentication result, the access of the access device.

For example, if the access device passes through the authentication carried out by the central control device, then it is allowed to access any resource in the first area restricted network where the access device is located, as shown by a process D in FIG. 5.

Particularly, in an example, the central control device may maintain (store) an area device service table (ADST) for each area restricted network. For example, in a dotted line box of FIG. 6, an ADST is shown. As shown in FIG. 6, the ADST may include a restricted area ID (also called an "area ID"), a device list, and a device function list. Here the area ID is used to indicate to which area restricted network the ADST belongs. The device list includes the device ID of each device in the area restricted network to which the ADST belongs. And the device function list includes the function of each device in the area restricted network to which the ADST belongs.

The ADST may be generated by the central control device at the establishment stage of the area restricted network system, and may be updated when the area restricted network system changes (e.g., a slave node has entered into or departed from an area restricted network thereof, or the roles of master and slave nodes in an area restricted network thereof have changed). For example, every time a new device has entered into an area restricted network, the new device reports its device ID and function(s) to the master node in the area restricted network, and then the master node informs the central control device of them. In this way, the central control device may be triggered to update the ADST; in other words, it may add the device ID and function(s) of the new device into the ADST. In addition, as shown in FIG. 5, after the access device passes through the authentication conducted by the central control device, for example, the central control device may add the access device into the bottom of the ADST belonging to the restricted area (whose area ID is 00000001) where the access device is located.

As a result, after the access device passes through the authentication carried out by the central control device, the central control device may add the device ID and function(s) of the access device into the corresponding ADST, and then, may provide the ADST to the access device. In this way, the access device may access any device listed in the ADST.

In what follows, an example will be given by referring to FIG. 6. As shown in FIG. 6, in an office, when an access device (e.g., a mobile phone shown in FIG. 6) has entered into a first area restricted network (whose area ID is 00000001) indicated by an oval shape, according to the method shown in FIG. 2, a central control device (AP) conducts authentication with respect to the access device. And after the access device passes through the authentication, the central control device may sends an ADST belonging to the first area restricted network to the access device. Here in the ADST, MFP_srcb101 refers to the master node (e.g., a printer) in the first area restricted network, and has printing and scanning functions. And in the ADST, IWB-_srcb102 refers to a slave node in the first area restricted network. In a case where the access device intends to print a document, for example, the access device may select a device having a printing function (e.g., the master node) from the ADST, so as to access it for printing the document.

Moreover, refer to FIG. 1 at the same time; as shown in FIG. 1, the central control device 150 may also communicate with a data center 160 via the Internet, etc. As a result, the access device, which has entered the first area restricted network, may also access, by utilizing the central control device 150, the data center 160 via the Internet, etc. For example, the access device may obtain a document stored in the data center 160, and may further access the master node MFP_srcb101 in the first area restricted network so as to let it print the obtained document, as described above.

As a result, according to the access control method of the area restricted network system, it is possible not only to be able to let the central control device centrally control the one or more area restricted networks so as to achieve the access of an access device but also to be able to keep the connection of the access device to the Internet.

Here it should be noted that although the above example of the access control method of the area restricted network system is one in an office environment, those people skilled in the art should know that the access control method of the area restricted network system may also be applied to any other proper scenario in which there are one and more area restricted networks.

In an example, optionally, the access control method shown in FIG. 2 may include a step of, if a predetermined condition is met, then disabling the authorized access of the access device. For example, the predetermined condition may be a predetermined valid time. If a time period from the time point when the access device is authorized to access a resource listed in a ADST exceeds the predetermined valid time, then the central control device may disable the authorized access of the access device. In this case, if the access device needs to continue to access a resource in the ADST, then it must resend an authentication request to the central control device. For example, the predetermined valid time may be 5 minutes, 10 minutes, etc.

In addition, the predetermined condition may be a predetermined event or operation for triggering disabling the authorized access of the access device. The predetermined event may be reaching a predetermined time point of accessing a resource listed in the ADST, for example, the time point after using a printer for 5 minutes or using a scanner for 30 minutes.

Of course, the above-described predetermined conditions are just examples. The present invention is not limited to this. In addition, if the authorized access of the access device is disabled, then the central control device may remove the record related to the access device from the ADST.

Therefore, by utilizing the access control method of the area restricted network system according to this embodiment, if it is detected that an access device has entered into an area restricted network in the system, then it is possible to generate authentication information for the access device by the master node in the area restricted network; after that, the access device utilizes the authentication information to send an authentication request to the central control device in the system. In this way, it is possible to achieve the access control of the access device centrally conducted by the central control device, and at the same time, it is also possible to keep the access of the access device to the Internet.

Figure 7:
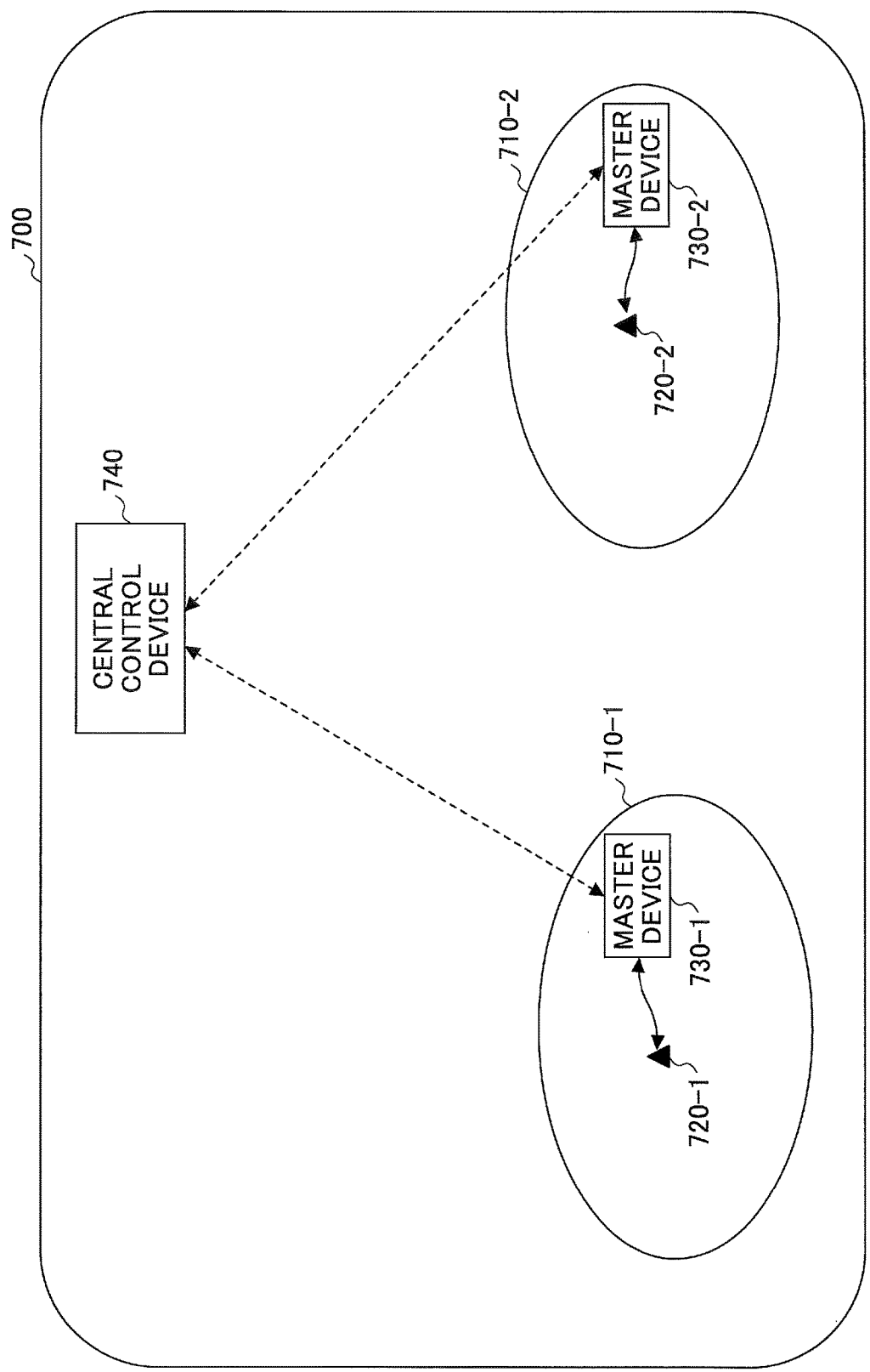
FIG. 7 is a block diagram of a communications system according to an embodiment of the present invention.

FIG. 7 is a block diagram of a communications system according to an embodiment of the present invention.

As shown in FIG. 7, a communications system 700 includes area restricted networks 710-1 and 710-2 as well as a central control device 740.

Similar to the area restricted networks 120-1 to 120-4 shown in FIG. 1, the area restricted networks 710-1 and 710-2 (if it is not necessary to distinguish between the two, they may called an "area restricted network 710") respectively include area restriction signal transmission devices 720-1 and 720-2 (if it is not necessary to distinguish between the two, they may be called an "area restriction signal transmission device 720") as well as master devices 730-1 and 730-2 (if it is not necessary to distinguish between the two, they may be called a "master device 730") respectively associated with the area restriction signal transmission devices 720-1 and 720-2. The area restriction signal transmission device 720 and its associated master device 730 are located in the area restricted network 710 restricted by an area restriction signal sent by the area restriction signal transmission device 720.

In other words, the communications system 700 may include at least one area restriction signal transmission device 720, at least one master device 730 associated with the at least one area restriction signal transmission device 720, and one central control device 740.

Each area restriction signal transmission device 720 transmits an area restriction signal which is used to define (restrict) an area restricted network, and detects whether an access device has entered into the area restricted network defined by the area restriction signal transmitted by the corresponding area restriction signal transmission device 720. Each master device 730 is associated with an area restriction signal transmission device 720; receives an authentication information request, sent by an access device which is detected by the associated area restriction signal transmission device 720, which is used to request authentication information for the access device from the corresponding master device 730; and in response to the authentication information request, generates and sends the authentication information for the access device to the access device. The central control device 740 receives an authentication request from the access device, and on the basis of the authentication information of the access device, conducts authentication with respect to the access device.

In an example, the signal strength of an area restriction signal received at the access device and broadcasted by the area restriction signal transmission device 720 is detected by the corresponding mater device 730. If the signal strength is greater than the first threshold, then it may be determined that the access device has entered into the area restricted network defined by the area restriction signal. And if the signal strength is less than the second threshold, then it may be determined that the access device has departed from the area restricted network.

In an example, the authentication information request includes a device ID of the access device, and in response to the authentication information request, the corresponding master device 730 generates, on the basis of the device ID of the access device included in the authentication information request, the authentication information for the access device.

In an example, the authentication information request sent by the access device is received and forwarded to the corresponding master device 730 in the corresponding area restricted network by the corresponding area restriction signal transmission device 720. The authentication information sent by the corresponding master device 730 is received and forwarded to the access device by the corresponding area restriction signal transmission device 720.

In an example, the central control device 150 receives an authentication request from the access device, and acquires the authentication information generated by the corresponding master device 730 from the corresponding master device. And then, the central control device 150 conducts authentication with respect to the access device by comparing the authentication information provided by the access device with the authentication information acquired from the corresponding master device 730.

In an example, the central control device 150 generates a ADST for each area restricted network in the area restricted network system, and conducts access control with respect to the access device, which has passed through the authentication, on the basis of the corresponding ADST.

In an example, the ADST of each area restricted network includes an area ID of the corresponding area restricted network as well as an device ID and function list of each device in the corresponding area restricted network.

In an example, after the access device has passed through the authentication conducted by the central control device 150, the central control device adds the access device into the ADST of the corresponding area restricted network so as to update the ADST.

As a result, by utilizing the communications system according to this embodiment, after an access device has entered into an area restricted network in the communications system, the master device 130 in the area restricted network may generate authentication information for the access device, and the access device may use the authentication information generated by the master device 130 to send an authentication request to the central control device 150 in the communications system. In this way, it is possible to centrally control the access of an access device to the plural area restricted networks in the communications system by the central control device 150 thereof. And at the same time, in the communications system, it is also possible to let the access device continuously access the Internet.

In addition, the communications system 700 shown in FIG. 7 may include or may not include one or more slave devices. For the sake of convenience, no slave device is illustrated in FIG. 7.

Figure 8:
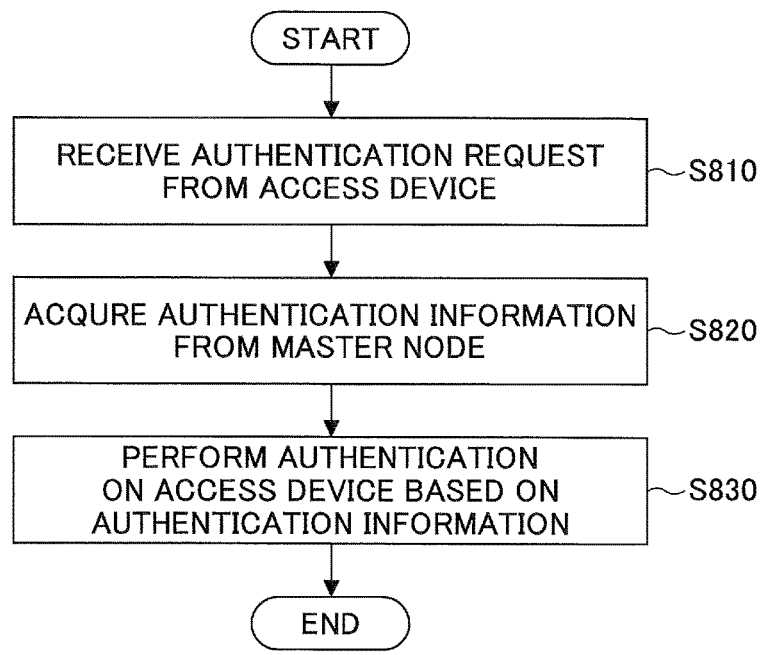
FIG. 8 is a flowchart of an authentication method of carrying out authentication with respect to an access device, according to an embodiment of the present invention.

FIG. 8 is a flowchart of an authentication method of carrying out authentication with respect to an access device, according to an embodiment of the present invention.

As shown in FIG. 8, the authentication method according to this embodiment may be applied to an area restricted network system as described above, in which there are one or more area restricted networks. And each of the area restricted network may include a master node, and may or may not include one or more slave nodes.

As shown in FIG. 8, the authentication method may include STEPS S810, S820, and S830.

In STEP S810, the authentication request sent by an access device, which has entered into an area restricted network in the area restricted network system, is received.

In STEP S820, in response to the authentication request, authentication information generated by the master node in the area restricted network for the access device is acquired from the master node.

In STEP S830, on the basis of the authentication information included in the authentication request received from the access device as well as the authentication information acquired from the master node, authentication is conducted with respect to the access device.

Particularly, in an example, the authentication request received from the access device in STEP S810 may include an authentication frame which is generated on the basis of the authentication information provided from the master node to the access device in response to an authentication information request sent by the access device, as described above. For example, the authentication information may include a device ID and authentication key of the access device, and the authentication key is generated by the master node on the basis of the device ID of the access device.

In STEP S820, in response to the authentication request received from the access device, an authentication frame generated for the access device by the master node in the area restricted network, where the access device is located, is acquired from the master node, as described above.

In STEP S830, it is possible to obtain, by analyzing the authentication frames provided from the access device and the master node, the authentication informations thereof, respectively. And then, it is possible to conduct, by comparing the respectively obtained authentication informations, authentication with respect to the access device. For example, if the respectively obtained authentication informations are the same, then the access device may pass through the authentication; otherwise, it may not. After that, the access device may access any resource in the area restricted network.

The authentication method according to this embodiment may be performed by an authentication device. An example of the authentication device is the above-described central control device. As a result, by utilizing the authentication method, it is possible to centrally conduct authentication with respect to an access device intending to access any area restricted network in an area restricted network system, so as to centrally conduct access control with respect to the access device in the area restricted network system.

Figure 9:
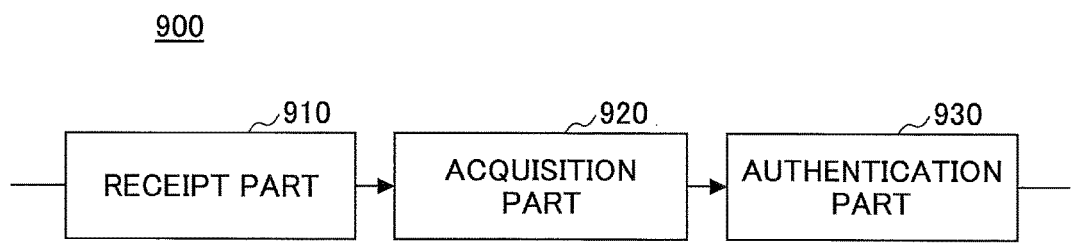
FIG. 9 is a block diagram of an authentication device for carrying out authentication with respect to an access device, according to an embodiment of the present invention.
Figure 10A:
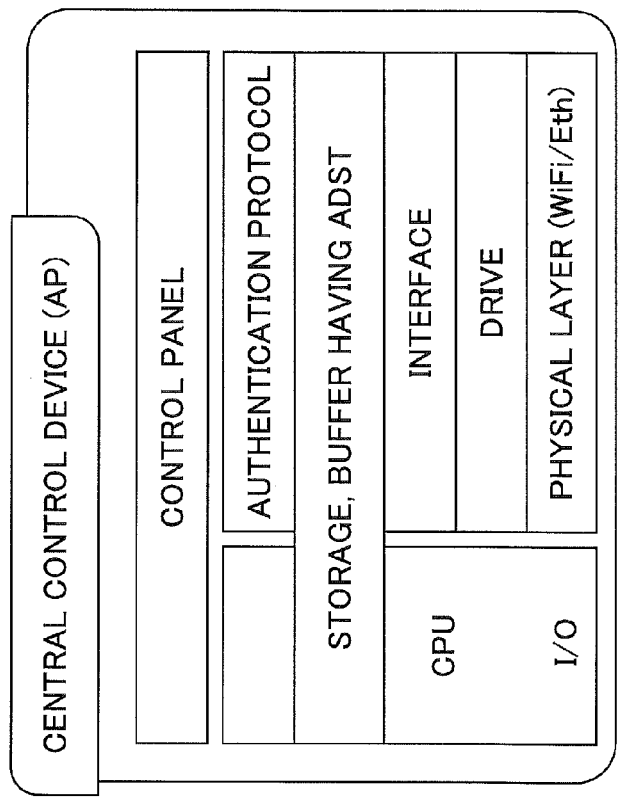
FIGS. 10A to 10D respectively illustrate block diagrams of an access device, a central control device, a master (or slave) device, and an area restriction signal transmission device which are able to be applied to the embodiments of the present invention.
Figure 10B:
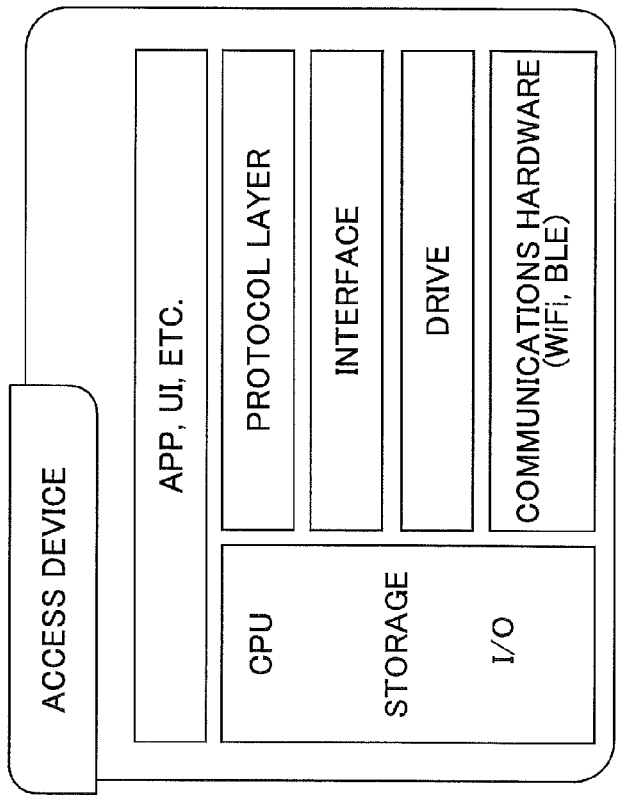
Figure 10D:
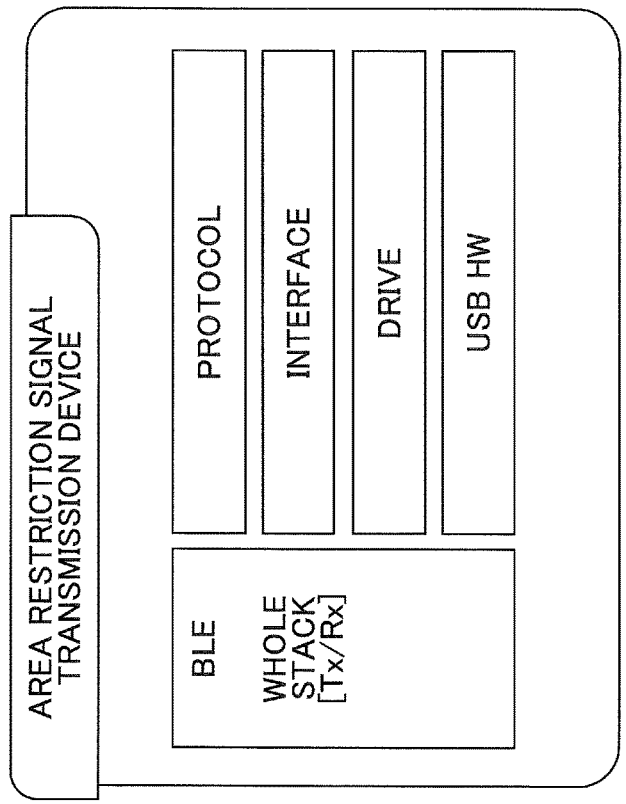
Figure 10C:
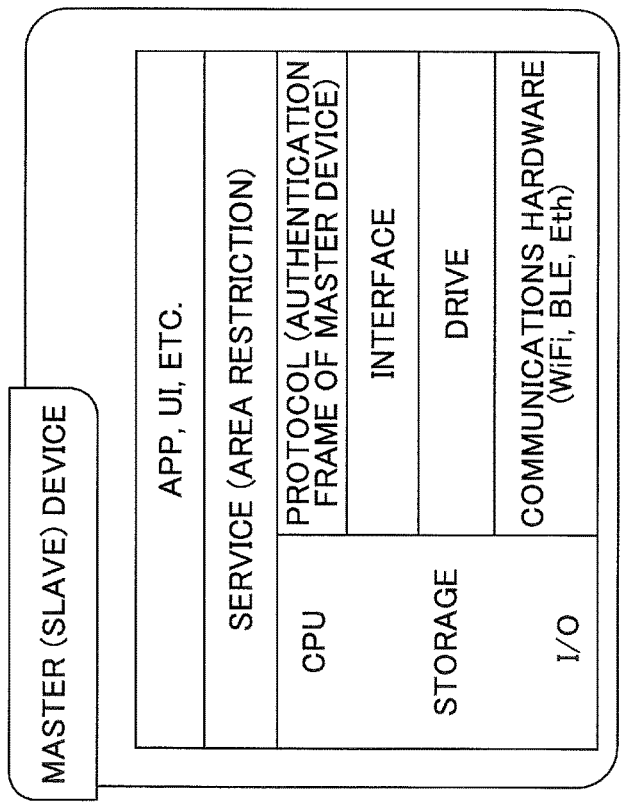

FIG. 9 is a block diagram of an authentication device for carrying out authentication with respect to an access device, according to an embodiment of the present invention.

As shown in FIG. 9, an authentication device 900 may include a receipt part 910, an acquisition part 920, and an authentication part 930.

The receipt part 910 may be configured to receive an authentication request from an access device which has entered into a first area restricted network in an area restricted network system including plural area restricted networks. The authentication request includes authentication information of the access device.

The acquisition part 920 may be configured to, in response to the received authentication request, acquire authentication information generated for the access device by the master node in the first area restricted network from the master node.

The authentication part 930 may be configured to, on the basis of the authentication information included in the received authentication request and the authentication information acquired from the master node, authentication with respect to the access device.

As a result, by utilizing the authentication device according to this embodiment, it is possible to centrally conduct authentication with respect to an access device in the area restricted network system, so as to centrally conduct access control with respect to the access device.

FIGS. 10A to 10D respectively illustrate block diagrams of an access device, a central control device, a master (or slave) device, and an area restriction signal transmission device which are able to be applied to the embodiments of the present invention.

Of course, what each of the devices shown in FIGS. 10A to 10D includes is just an example. That is to say, each of them may further include any other proper component.

As described above, the master (or slave) device may be any network device such as a computer, a printer, a scanner, or a projector. The area restriction signal transmission device may be a Bluetooth base station, an IR signal transmission device, etc. The central control device may be a router, etc. The access device may be any mobile device such as a cellular phone, a tablet computer, or a notebook computer.

Up to here, the access control method of an area restricted network system, the communications system including one or more area restricted networks, etc. according to the embodiments of the present invention have been illustrated in detail.

Here it should be noted that the adopted control method in the embodiments of the present invention is compatible with a standard framework related to wireless authentication and authorization in the conventional 802.11 protocol.

In addition, the above respective embodiments are just exemplary ones, and the specific structure and operation of each of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201410327928.0 filed on Jul. 10, 2014, the entire contents of which are hereby incorporated by reference.

What is claimed is:

1. An access control method of an area restricted network system including a central control device that allows access to any resource in one or more area restricted networks, each area restricted network amongst the area restricted networks including at least a master node, and an area restriction signal transmission device which is associated with the master node in the corresponding area restricted network and broadcasts an area restriction signal for restricting the corresponding area restricted network, the access control method comprising:

(a) detecting that an access device has entered into a first area restricted network in the area restricted network system, and sending, by the area restriction signal transmission device, a response to a connection request from the access device upon detecting that the access device has entered into the first area restricted network, and establishing a connection between the area restriction signal transmission device and the access device;

(b) forwarding by the area restriction signal transmission device to the associated master node in the first area restricted network, an authentication information request received by the area restriction signal transmission device from the access device, the authentication information request being used to request authentication information for the access device from the master node;

(c) forwarding, by the area restriction signal transmission device to the access device, authentication information from the master node, in response to the authentication information request; and (d) performing authentication of the access device, by the central control device in response to an authentication request from the access device, based on the authentication information obtained by the access device via the area restriction signal transmission device from the master node, the access device being permitted to simultaneously access the first area restricted network and another network which is external to the system, after authentication.

2. The method according to claim 1, wherein the detection in (a) includes:
determining a signal strength of the area restriction signal which is used to restrict the first area restricted network and is received by the access device,
wherein, if the signal strength is greater than a first threshold, then determining that the access device has entered into the first area restricted network, and if the signal strength is less than a second threshold, then determining that the access device has departed from the first area restricted network.

3. The method according to claim 2, wherein the authentication information request includes a device ID of the access device, and the master node in the first area restricted network generates, in response to the received authentication information request, the authentication information based on the device ID included in the authentication information request.

4. The method according to claim 3, wherein the authentication information request sent by the access device is received and forwarded to the master node in the first area restricted network by the area restriction signal transmission device, and the authentication information sent by the master node is received and forwarded to the access device by the area restriction signal transmission device.

5. The method according to claim 2, further comprising:
comparing the authentication information acquired from the master node and the authentication information provided to the central control device by the access device so as to conduct the authentication with respect to the access device.

6. The method according to claim 1, further comprising:
generating, by the central control device, an area device service table for each area restricted network in the area restricted network system, and conducting access control with respect to an authenticated access device based on a corresponding area device service table.

7. The method according to claim 6, wherein the area device service table of each area restricted network includes an area ID of the corresponding area restricted network as well as a device ID and a device function list of each device in the corresponding area restricted network.

8. The method according to claim 7, wherein after the access device passes through the authentication conducted by the central control device, the central control device adds the access device into an area device service table corresponding to the first area restricted network so as to update the area device service table.

9. An authentication method of conducting authentication with respect to an access device, which is used by a central control device that allows access to any resource in an area restricted network system that includes one or more area restricted networks, each area restricted network amongst the area restricted networks including at least one master node, and an area restriction signal transmission device which is associated with the master node in the corresponding area restricted network and broadcasts an area restriction signal for restricting the corresponding area restricted network, the authentication method comprising:

(a) receiving by the central control device an authentication request from the access device which has entered into a first area restricted network in the area restricted network system, the authentication request requesting authentication of the access device by the central control device based on authentication information obtained by the access device via the area restriction signal transmission device from the associated master node;

(b) acquiring, by the central control device, in response to the authentication request, authentication information from the master node in the first area restricted network; and (c) performing, based on (i) the authentication information included in the authentication request received by the central control device from the access device and (ii) the authentication information acquired by the central control device from the master node, an authentication process by the central control device with respect to the access device to be authenticated, the access device being permitted to simultaneously access the first area restricted network and another network which is external to the system, after authentication.

10. An authentication device for conducting authentication with respect to an access device, which is used to allow access to any resource in an area restricted network system that includes one or more area restricted networks, each area restricted network amongst the area restricted networks including at least one master node, and an area restriction signal transmission device which is associated with the master node in the corresponding area restricted network and broadcasts an area restriction signal for restricting the corresponding area restricted network, the authentication device comprising:

a receipt part to receive an authentication request from the access device which has entered into a first area restricted network in the area restricted network system, the authentication request requesting authentication of the access device by the authentication device based on authentication information obtained by the access device via the area restriction signal transmission device from the associated master node;

an acquisition part to acquire, in response to the authentication request, authentication information from the master node in the first area restricted network; and an authentication part to perform, based on the authentication information included in the authentication request received from the access device and the authentication information acquired from the master node, an authentication process with respect to the access device, the access device being permitted to simultaneously access the first area restricted network and another network which is external to the system, after authentication, wherein the functions of the receipt part, the acquisition part and the authentication part are implemented by execution by a processor of the host authentication device, of one or more programs stored in a non-transitory computer readable medium.

* * * * *